United States Patent [19]

Takamura et al.

[11] Patent Number: 4,494,833

[45] Date of Patent: Jan. 22, 1985

[54] EYEGLASS-FRAME

[75] Inventors: Masayuki Takamura; Kazuo Kurahashi, both of Shizuoka, Japan

[73] Assignee: Nippon Gakki Seizo Kabushiki Kaisha, Japan

[21] Appl. No.: 368,039

[22] Filed: Apr. 13, 1982

[30] Foreign Application Priority Data

Apr. 15, 1981 [JP] Japan ......................... 56-054142[U]

[51] Int. Cl.³ .......................... G02C 5/18; G02C 5/02
[52] U.S. Cl. ...................................... 351/41; 351/117; 351/129
[58] Field of Search ................. 351/41, 111, 117, 124, 351/129

[56] References Cited

U.S. PATENT DOCUMENTS 1,647,152  11/1927  Searles ................................ 351/117

FOREIGN PATENT DOCUMENTS 53-26220  3/1978  Japan ................................. 351/41
54-111841  9/1979  Japan ................................. 351/41
55-35332  3/1980  Japan ................................. 351/41

Primary Examiner—Rodney B. Bovernick
Attorney, Agent, or Firm—Ostrolenk, Faber, Gerb & Soffen

[57] ABSTRACT

A metallic eyeglass-frame, in particular its each bow has a core-to-covering structure in which high silver or gold-content covering is clad to the surface of a super elastic core made of Cu-Sn-Zn, Cu-Al-Zu or Cu-Al-Ni alloys in order to reduce plastic deformation during use and assure high work ability in production, thereby allowing the eyeglass-frame to constantly rest stably on the wearer's facial construction with no increase in uncomfortableness and fatigue on the wearer.

11 Claims, 2 Drawing Figures

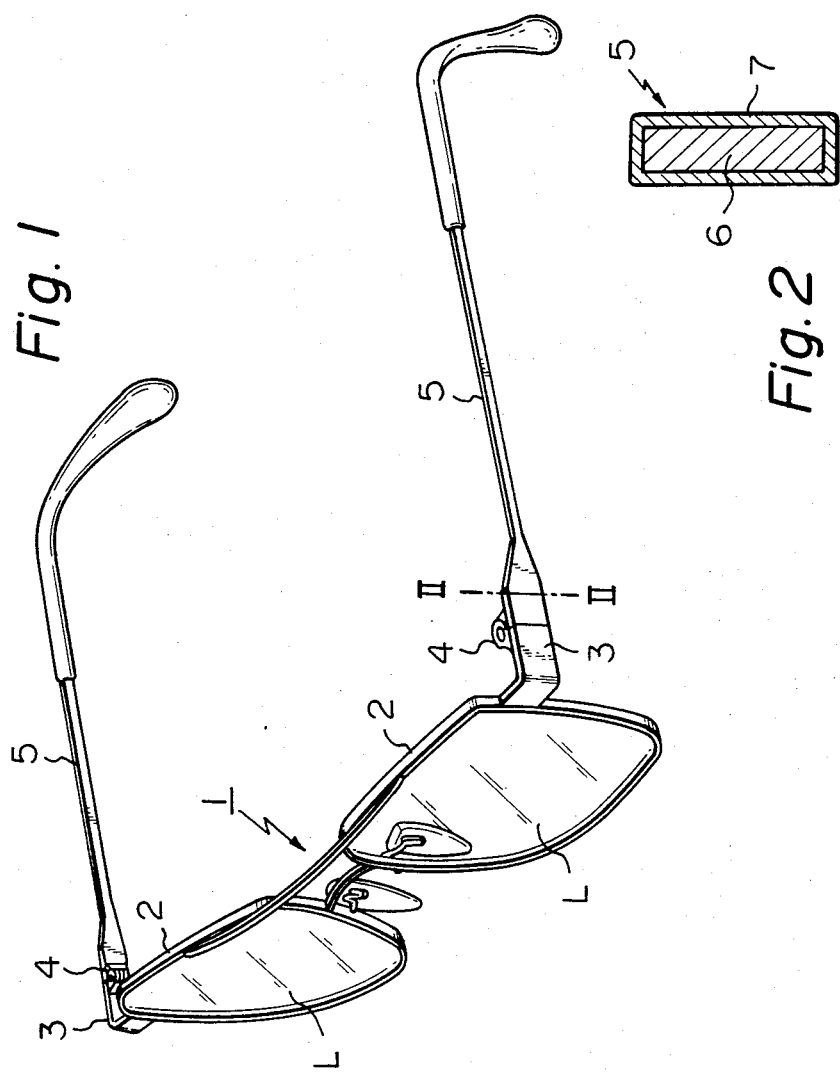

EYEGLASS-FRAME

BACKGROUND OF THE INVENTION

The present invention relates to an eyeglass-frame, and more particularly relates to an improved construction of bows for an metallic eyeglass-frame.

An eyeglass-frame with excellent fitness to the wearer's facial construction and high workability is increasingly damanded not only in the medical fields for use as an eyesight improver but also in the field of fashionable world.

An eyeglass-frame in general comprises a pair of rims each holding a lense and a pair of bows or sided for stably holding the rims in position on the wearer's facial construction. In particular the bows are regarded as the most important elements in the construction of the eyeglass-frame. It is intensely required for the bows to be able to hold the eyeglasses on the wearer's facial construction for an appreciable long period without causing any uncomfortableness and fatigue on the wearer. To this end, lots of proposals have been made regarding improvement of an eyeglass-frame from the viewpoint of both construction and material.

In the construction of a typical conventional eyeglass-frame, each bow includes a core made up of stainless steel, copper alloy, or nickel base alloy including chromium or copper, and a gold covering or sheath clad to the core. These metallic materials, however, have an inbred disadvantage to develop so-called plastic deformation when an external force beyond a certain limit is applied to the bows, in particular when such a large force is applied repeatedly. As a consequence, when the bows are too much pulled sideways during use of the eyeglasses, such a plastic deformation tends to be developed on the bows whilst leaving a permanent strain and disenables correct and stable positioning of the eyeglasses on the wearer's facial construction. In addition, seasonal change in temperature of the environment is liable to wield a great influence upon the mode of fitness of the bows to the wearer's face in particular in facial sections such as the temples an ear lobes, thereby furthering uncomfortableness and fatigue on the wearer of the eyeglasses.

In order to avoid the above-described disadvantages, it is thinkable to use, as the material for the bows of an eyeglass-frame, a metallic material having a high elastic limit or a super elastic material such as nickel-titanium alloys. Use of such a super elastic material, in particular use of nickel-titanium alloys tends to disenable smooth blazing of parts forming the eyeglass-frame, drawing or pressing for a shaping of the bows, and plating for decoration and/or anti-erosion purposes.

It is the object of the present invention to provide an improved metallic eyeglass-frame with significantly high elastic limit which assures long-lasting stability and ideal fitness in use with excellent workability in production.

In accordance with the basic aspect of the present invention, at lease each bow of an eyeglass-frame is provided with a core-to-covering clad structure in which a core is made of an alloy chosen from a group consisting of copper-tin zinc alloys, copper-aluminum-zinc alloys and copper-aluminum-nickel alloys, and a covering clad to the core is made of silver, silver base alloys, gold or gold base alloys.

BRIEF DESCRIPTION OF THE DRAWINGS

FIG. 1 is a perspective view of an eyeglass-frame which the present invention is advantageously applied to, and FIG. 2 is a section taken along a line II—II in FIG. 1.

DESCRIPTION OF THE PREFERRED EMBODIMENTS

One example of the eyeglass-frame in accordance with the present invention is illustrated in FIG. 1, in which the eyeglass-frame 1 includes a pair of rims each holding a lense L, a pair of decorations of lugs 3 projecting sideways from the associated rims 2, and a pair of bows or sides 5 pivotally coupled to the decorations 3 by means of hinges 4 and extending rearwards. In accordance with the present invention, each bow 5 is provided with a particular core-to-covering clad structure as later described in more detail.

As briefly described already, at least each bow of the eyeglass-frame in accordance with the present invention is provided with a core-to-covering clad structure such as shown in FIG. 2. That is, the clad structure of the bow 5 includes a core 6 made of a material which exhibits super elasticity at room temperatures. More specifically, the core 6 is made of copper-tin-zinc alloys, copper-aluminum-zinc alloys or copper-aluminum-nickel alloys. The clad structure further includes a covering 7 clad to the surface of the core 6 made of silver, silver base alloys, gold or gold base alloys.

The copper-tin-zinc alloy for the core 6 should preferably contain 15.5 to 18.9% by weight of tin and up to 12.0% by weight of zinc. The copper-aluminum-zinc alloy for the core 6 should preferably contain 0.01 to 1% by weight of aluminum and 38 to 45% by weight of zinc. It may further contain 0.05 to 0.8% by weight of silicon. The copper-aluminum-nickel alloy for the core 6 should preferably contain 13.5 to 15.0% by weight of aluminum and 3 to 5% by weight of nickel. It may further contain 0.05 to 0.8% by weight of silicon and/or 1 to 3% by weight of chromium.

The silver base alloy for the covering 7 should preferable contain 1 to 25% by weight of copper and 0.1 to 4% by weight of palladium. It may further contain at least one of 0.1 to 10% by weight of gold, 0.1 to 2% by weight of zinc and up to 10% by weight of nickel. The gold base alloy for the covering 7 should preferable contain at lease one of 1 to 40% by weight of copper, 1 to 20% by weight of zinc, and up to 30% by weight of silver. It may further contain at least one of up to 10% by weight of palladium and up to 5% by weight of nickel.

The thickness of the covering 7 on the core 6 in the region of the bows 5 should preferable be in a range from 2 to 150 $\mu$m, and more preferably in a range form 10 to 70 $\mu$m. When the thickness of the covering falls short of 2 $\mu$m, destruction of the covering is apt to occur during plastic deformation after cladding such as drawing or pressing. Deficient thickness of the covering may also cause difficulty in plating and blazing processes. When the thickness exceeds 70 $\mu$m, in particular 150 $\mu$m, too large content of the covering in the clad structure will impair the super elastic nature accruing from the presence of the core.

Although a rectangular cross sectional profile of the bow is exemplified in FIG. 2, same may be replaced by a circular or oval profile depending on the requirement in use of the eyeglasses.

EXAMPLE

Rods of 40 mm. diameter and 300 mm. length were formed by using the alloys listed in the table and used for the cores. The coverings were given in the form of metallic pipes shown in the table. Each covering was inserted over each core in order to form a core-to-covering structure which was them subjected to cladding. After pressing, the structure was subjected to heat treatment in order to possess a super elastic nature. The bow samples so obtained were then subjected to bending tests whose results are given in the table.

In the bending test, one end of each bow sample was held firm in a cantilever fashion and prescribed amount of load was applied to the free end of the bow sample. Bending strain was measured at a point whereat the permanent strain was 0.1%. This value was named "the maximum springback strain" as shown in the table.

| Sample No. | Thickness of pipe in μm. | Clad ratio. | Core | Material for pipe | Maximum springback strain in % |
|---|---|---|---|---|---|
| 1  | 18 | 9.3  | Cu—17.8sn    | Au—10Cu—6Ag | 0.9  |
| 2  | 33 | 17.3 | "            | "           | 0.6  |
| 3  | 43 | 24.4 | "            | "           | 0.2  |
| 4  | 17 | 9.3  | Cu—14Al—4Ni  | "           | 0.85 |
| 5  | 34 | 17.3 | "            | "           | 0.7  |
| 6  | 48 | 24.4 | "            | "           | 0.3  |
| 7  | 16 | 9.3  | Cu—39Zn—0.7Al | Ag—10Cu    | 1.0  |
| 8  | 37 | 17.3 | "            | "           | 0.85 |
| 9  | 49 | 24.4 | "            | "           | 0.3  |
| 10 | 17 | 9.3  | "            | Ag—12.5Cu   | 1.1  |
| 11 | 33 | 17.3 | "            | "           | 1.0  |
| 12 | 45 | 24.4 | "            | "           | 0.7  |

We claim:
1. An eyeglass-frame comprising a pair of bows having a core-to-covering structure which includes a core exhibiting super elasticity at room temperatures and a covering clad to said core, said core being made of a material chosen from a group consisting of copper-tin-zinc alloys, copper-aluminum-zinc alloys and copper-aluminum nickel alloys, and said covering being made of a material chosen from a group consisting of silver, silver base alloys, gold and gold base alloys.
2. An eyeglass-frame as claimed in claim 1 in which said copper-tin-zinc alloy for said core containes 15.5 to 18.9% by weight of tin and up to 12.0% by weight of zinc.
3. An eyeglass-frame as claimed in claim 1 in which said copper-aluminum-zinc alloy for said core contains 0.01 to 1% by weight of aluminum and 38 to 45% by weight of zinc.
4. An eyeglass-frame as claimed in claim 3 in which said copper-aluminum-zinc alloy further contains 0.05 to 0.8% by weight of silicon.
5. An eyeglass-frame as claimed in claim 1 in which said copper-aluminum-nickel alloy contains 13.3 to 15.0% by weight of aluminum and 3 to 5% by weight of nickel.
6. An eyeglass-frame as claimed in claim 5 in which said copper-aluminum-nickel alloy further contains at least one of 0.05 to 0.8% by weight of silicon and 1 to 3% by weight of chromium.
7. An eyeglass-frame as claimed in claim 1 in which said silver base alloy contains at least on of 1 to 25% by weight of copper and 0.1 to 4% by weight of palladium.
8. An eyeglass-frame as claimed in claim 7 in which said silver base alloy further contains at least one of 0.1 to 10% by weight of gold, 0.1 to 2% by weight of zinc and up to 10% by weight of nickel.
9. An eyeglass-frame as claimed in claim 1 in which said gold base alloy contains at least one of 1 to 40% by weight of copper, 1 to 20% by weight of zinc and up to 30% by weight of silver.
10. An eyeglass-frame as claimed in claim 9 in which said gold base alloy further contains at least one of up to 10% by weight of palladium and up to 5% by weight of nickel.
11. An eyeglass-frame as claimed in claim 1 in which the thickness of said covering is in a range from 2 to 150 μm.

* * * * *